(12) United States Patent
Watrin et al.

(10) Patent No.: US 11,031,842 B2
(45) Date of Patent: Jun. 8, 2021

(54) COMPACT GEAR MOTOR

(71) Applicant: MMT AG, Zug (CH)

(72) Inventors: Mathieu Watrin, La Chaux-de-Fonds (CH); Christophe Adler, Malleray (CH); Philippe Brossard, Frambouhans (FR)

(73) Assignee: MMT AG, Zug (CH)

( * ) Notice: Subject to any disclaimer, the term of this patent is extended or adjusted under 35 U.S.C. 154(b) by 271 days.

(21) Appl. No.: 16/343,242

(22) PCT Filed: Oct. 19, 2017

(86) PCT No.: PCT/EP2017/076733
§ 371 (c)(1),
(2) Date: Apr. 18, 2019

(87) PCT Pub. No.: WO2018/073354
PCT Pub. Date: Apr. 26, 2018

(65) Prior Publication Data
US 2019/0252944 A1 Aug. 15, 2019

(30) Foreign Application Priority Data
Oct. 19, 2016 (FR) ...................................... 1660124

(51) Int. Cl.
*H02K 7/11* (2006.01)
*H02K 7/08* (2006.01)
(Continued)

(52) U.S. Cl.
CPC ............. *H02K 7/1166* (2013.01); *F16H 1/06* (2013.01); *F16H 1/16* (2013.01); *F16H 1/20* (2013.01); *F16H 57/02* (2013.01); *H02K 5/124* (2013.01); *H02K 5/225* (2013.01); *H02K 7/081* (2013.01); *H02K 7/12* (2013.01); *H02K 11/40* (2016.01); *F16H 2057/02034* (2013.01)

(58) Field of Classification Search
CPC ...... H02K 7/1166; H02K 11/40; H02K 5/225; H02K 5/24; H02K 7/081; H02K 7/12; F16H 1/06; F16H 1/16; F16H 1/20; F16H 57/02; F16H 2057/02034
See application file for complete search history.

(56) References Cited

U.S. PATENT DOCUMENTS 9,150,097 B2 10/2015 Boom et al.
9,168,828 B2 10/2015 Bourqui
(Continued)

FOREIGN PATENT DOCUMENTS

KR 20140025097 A 3/2014

*Primary Examiner* — Thomas Truong
(74) *Attorney, Agent, or Firm* — Harness, Dickey & Pierce, PLC

(57) ABSTRACT

The disclosure relates to a gear motor made of a housing enclosing an electric motor driving a reduction gear train having at least one intermediate gear and an output wheel, including an output wheel made of a single piece having a tooth crown on either side of which extend cylindrical axial extensions which are each held by the housing, each one of the extensions having at its respective end a coupling with an external drive element. The output wheel is coaxial with a toothed wheel constituting one of the intermediate gears, the toothed wheel being able to rotate freely in relation to one of the axial extensions.

19 Claims, 7 Drawing Sheets

(51) Int. Cl.
*H02K 7/116* (2006.01)
*F16H 1/06* (2006.01)
*H02K 11/40* (2016.01)
*F16H 1/16* (2006.01)
*F16H 1/20* (2006.01)
*F16H 57/02* (2012.01)
*H02K 5/22* (2006.01)
*H02K 5/124* (2006.01)
*H02K 7/12* (2006.01)

(56) References Cited

U.S. PATENT DOCUMENTS

| | | |
|---|---|---|
| 9,238,405 B2 | 1/2016 | Koh et al. |
| 9,614,426 B2 | 4/2017 | Heinrich |
| 2018/0347682 A1* | 12/2018 | Masuzawa .......... F16H 57/0493 |

* cited by examiner

COMPACT GEAR MOTOR

CROSS-REFERENCE TO RELATED APPLICATIONS

This application is a National Phase Entry of International Patent Application No. PCT/EP2017/076733, filed on Oct. 19, 2017, which claims priority to French Patent Application No. 16/60124, filed on Oct. 19, 2016, both of which are incorporated by reference herein.

TECHNICAL FIELD

The field of invention is that of fluid circulation inside a motor vehicle (for example: air conditioning flaps, water thermostat valve, . . . ) and also relates to the controlled circulation of air coming from the outside (for example air screen flap). It more particularly relates to a compact gear motor made of a housing enclosing an electric motor and a reduction gear train.

In the case of air intake flaps, many current vehicles have one or more outside air intake flaps located in the grille at the engine compartment. These flaps can be moved between a closed position to isolate the engine compartment, for example to improve the aerodynamics of the vehicle, or to optimise the thermal control of the engine compartment, and an open position to allow the air in the engine compartment to be renewed by air from the outside. These flaps are controlled by an actuator either by means of a linkage system or by means of a pinion drive, the degree of opening of the flaps being controlled by a computer. For vehicles operating at high speeds (e.g. motorway driving conditions), the pressure on the flaps can reach high values requiring powerful actuators, but remaining small in size to allow discreet integration into the vehicle grille.

BACKGROUND

The state of the art is the patent application WO2013191330 describing a known example of a power unit intended to equip a grille flap control device. Another actuator for a vehicle flap grid is also known from U.S. Pat. No. 9,168,828. The European patent application EP2640590 describes another example of an adjustment device for adjusting an air inlet of an engine compartment of a motor vehicle.

The solutions of the prior art are poorly adapted when the gear motor has to provide a high power, with a high transmission ratio, in the order of 500 to 700, in a minimal space requirement. Sometimes the stresses on the gearbox mechanism cause premature wear and even failure of some components. In addition, the air inlet flaps must have a resting resistance torque in the absence of power supply to resist forced flap movement. Some of the solutions of the prior art do not meet this constraint, either because of a reversible transmission that forces the flaps to move, or because the output members of the gear motor do not resist the torque exerted during a forced movement of the flap.

Another disadvantage of the prior art relates to mechanical noise from vibrations of the rotor axis or some of the components of the gear motor. Finally, the actuators of the prior art have a shape factor that is not well suited for integration into the grille due to the positioning of the output axis at the end of the actuator.

SUMMARY

The aim of the present invention is to remedy the problems mentioned above. More particularly, it relates to a gear motor made of a housing enclosing an electric motor driving a reduction gear train with parallel axes, a reduction gear box having at least one intermediate gear and an output wheel, wherein:

said output wheel consists of a single piece having a tooth crown on either side of which extend cylindrical axial extensions which are each guided by the housing, each one of said extensions having at its respective end a coupling means with an external drive element, and said output wheel is coaxial with a toothed wheel constituting one of said intermediate gears, said toothed wheel being able to rotate freely in relation to one of said axial extensions.

In a preferred but not limiting embodiment, said output wheel has an axial through-cavity. To allow coupling to an external member to be controlled, at least one of said coupling means can be formed by a recessed socket drive or by two coaxial recessed socket drives. Advantageously, the motor on the one hand, and at least one of said intermediate gears on the other hand, are positioned on either side of the cross-sectional plan passing through the axis of the output stage.

Preferably, the housing has two bearings for guiding said axial extensions of the output stage. Possibly, said motor may have an output shaft provided with a worm screw. Even if not shown, it is indeed an alternative to the use of a spur gear motor, even if preferably the rotor axis of said motor is parallel to the axis of said output and is equipped with a toothed wheel driving the first of said intermediate gears.

In an alternative embodiment, a gear motor according to the invention may also have a rotor of said motor equipped with a dry friction pad, in order to allow a minimization of vibrations and the irreversibility of the gear motor. For this purpose, the gear motor can have a rotor comprising a toothed wheel and a flange that guides the rotor in rotation about the axis, as well as a spring and a counter-bearing so that the spring presses the counter-bearing on the axis of rotation in order to exert a friction force.

Preferably, the stator of said motor is constituted by a stack of sheets having N radially extending teeth, N being between 6 and 12, at least two of said teeth being wound. Preferably still, said first intermediate gear drives a second intermediate gear coaxial with the output stage. Advantageously, at least one of the wound teeth extends into the space delimited by the output crown on the one hand and the crown of one of said intermediate gears on the other hand.

In an alternative embodiment not shown, an axial motor can be considered, at least one of the wound teeth being accommodated, in the direction parallel to the output shaft, between the surface of the output crown on the one hand and the upper surface of the crown on the other hand. Still with a view to compactness, advantageously, said gear coaxial with the output wheel drives an additional intermediate gear consisting of a part with two coaxial tooth crowns having different cross-sections. To allow the printed circuit to be driven out without deforming the stator, it is also the purpose of the invention to allow insensitivity by action of a coil body having shoulders supporting the edges of the teeth adjacent to the pole carrying said coil, said coil body having connectors capable of interconnecting a printed circuit by force fitting in a direction perpendicular to the bearing plan of said shoulders.

It is also the purpose of the invention to allow the stator to be electrically grounded by means of a compression spring guided by a pin extending parallel to the axis of rotation of the motor on the bottom of the housing, the length of said spring being greater than the thickness of the stator, said compression spring coming into mechanical and electrical contact with the non-insulated surface of the edge of the stator sheet package and a non-insulated surface of the printed circuit when it is compressed by said printed circuit superposed on the stator. As a particular example that can be addressed with the invention, the adjustment of the air intake screens of an engine compartment of a motor vehicle, or even the thermal regulation valves should be mentioned, these applications being not restrictive.

BRIEF DESCRIPTION OF THE DRAWINGS

The present invention will be best understood when reading the following description thereof, which relates to a non restrictive exemplary embodiment, while referring to the appended drawings, wherein.

DETAILED DESCRIPTION

General Description of the Actuator

Figure 1A:
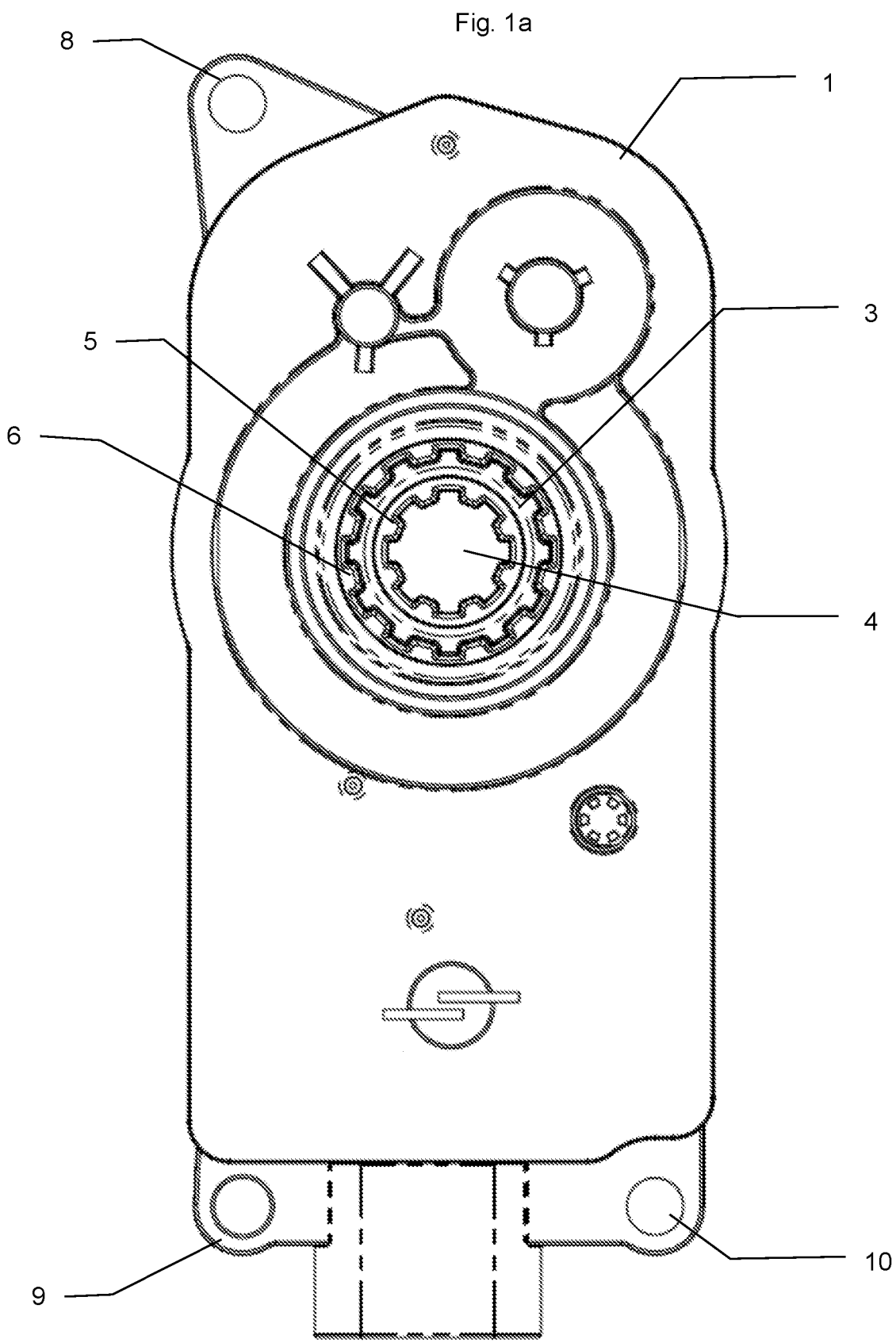
FIGS. 1a, 1b and 1c are respectively, top, bottom and front perspective views of the actuator in a preferred embodiment.
Figure 1B:
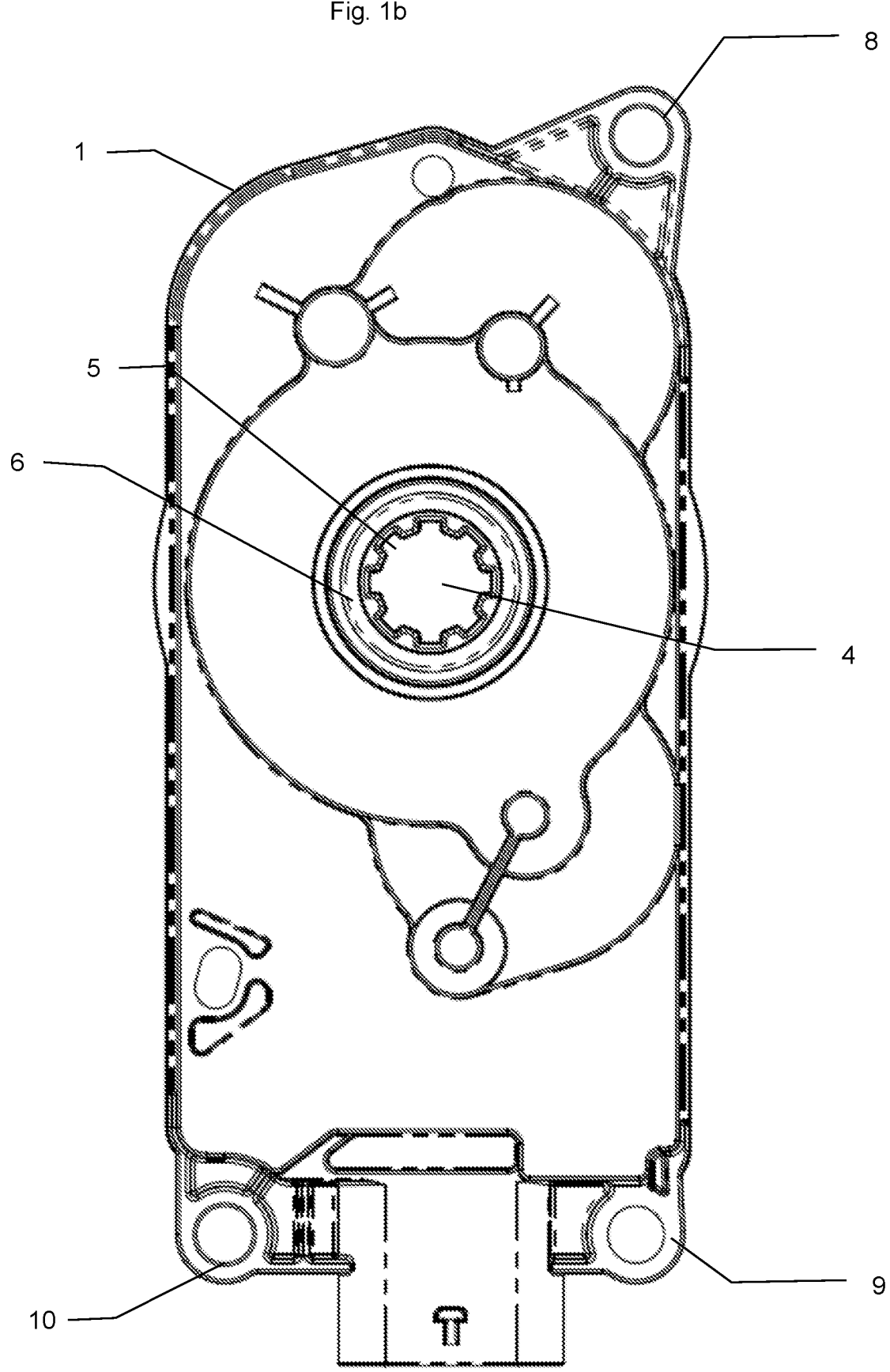
Figure 1C:
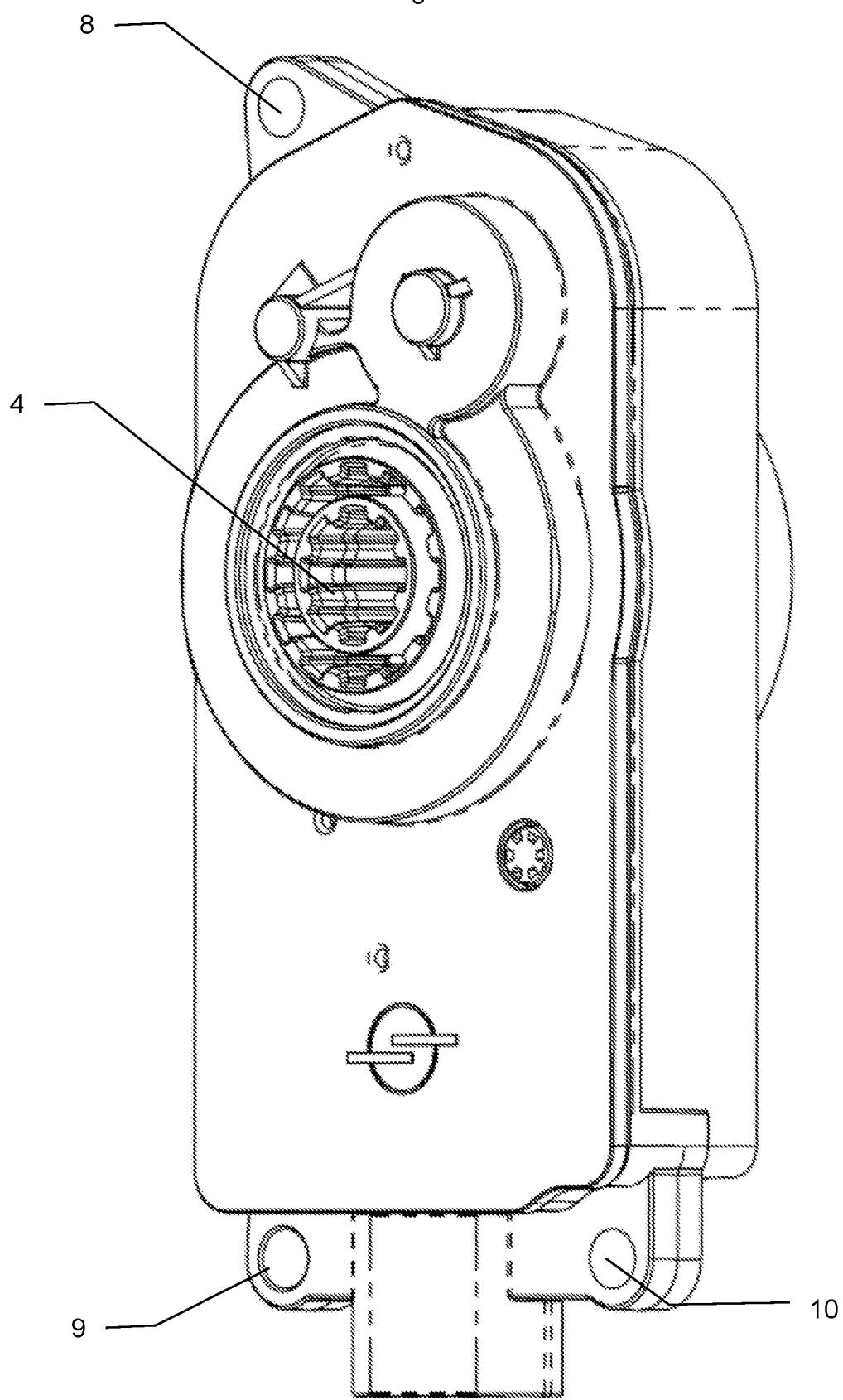

The actuator according to the invention consists of a housing 1 having openings on its two main faces for the passage of the coupling means. FIG. 1a shows the view of the upper main face of the housing 1. In the example described, the coupling means is a single cylindrical output part 3 with a central channel 4 opening at both ends.

The mechanical interface between the member to be controlled (e.g. a flap) and the electric actuator is generally provided by a male shaft, on the flap side, which is inserted into a female output wheel, on the actuator side. The mechanical interface must be able to transmit the torque generated by the actuator. For some applications where the flaps are visible on the grille, the actuator must have an output interface on each side of the actuator in order to be compatible with different flap systems:

a first flap system requires a torque of about 6 Nm and only uses one output interface,
 a second flap system requires a torque of about 4 Nm and uses both output interfaces on either side of the actuator.

The sizing of the electric motor and gear train of the actuator according to the invention makes it possible to manage torques of the order of 6 Nm. The output interface is an output member that opens on either side of the hollow shaft actuator, since the female socket passes through the entire actuator. In this non-exhaustive example, at least the terminal part of the middle channel 4 has a serrated area 5. This area 5, corresponding to a first socket, could have other known configurations to allow the transmission of a torque of rotation, for example a polygonal or oval inner section. In particular, the section can have an 8-point star shape formed by 2 squares.

In this example, this area 5 is enclosed by a second coaxial serrated area 6 corresponding to a second socket. The socket 5 incorporates grooves to transmit forces of about 4 Nm as efficiently as possible. A second socket 6 is provided around the first one. Thanks to its larger diameter and higher number of teeth, it can transmit typical torques of 6 Nm. To ensure the tightness of the actuators, shoulders are integrated on either side of the output wheel. They allow the insertion of two seals 11, 12 of different diameters. Finally, two bearings 23, 24 are present to respectively provide guiding in the housing and the cover.

The face opposite the cover also has a socket for coupling another drive member. This makes it possible to couple different shafts without having to change actuators, or to drive two output shafts, for example for flaps on either side of the housing 1. The housing has a connector 7 enclosing the electrical connection system, as well as fastening lugs 8 to 10.

Figure 2:
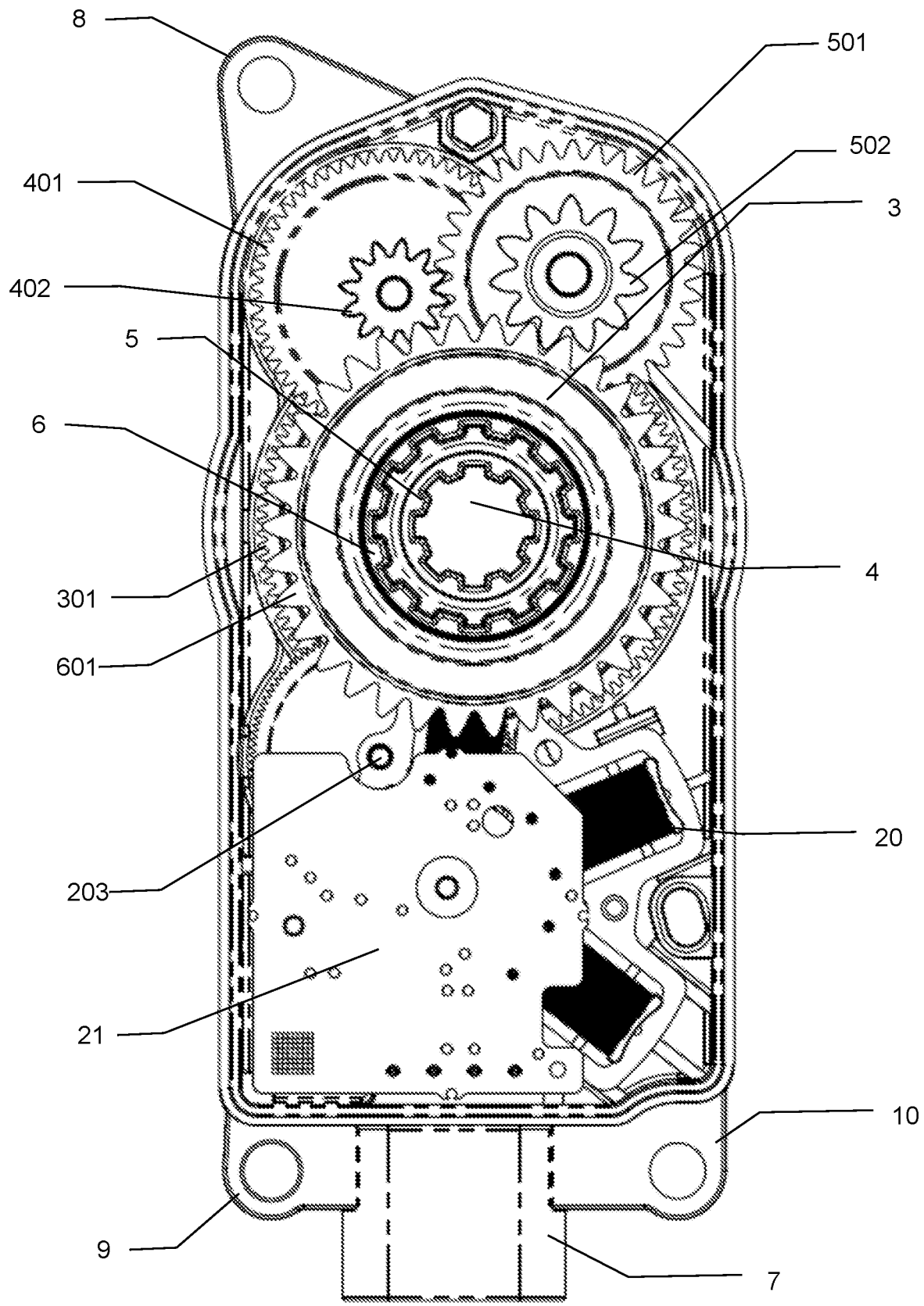
FIG. 2 shows an open top view (without cover or cover gasket) of the motor in FIGS. 1a to 1c.
Figure 6:
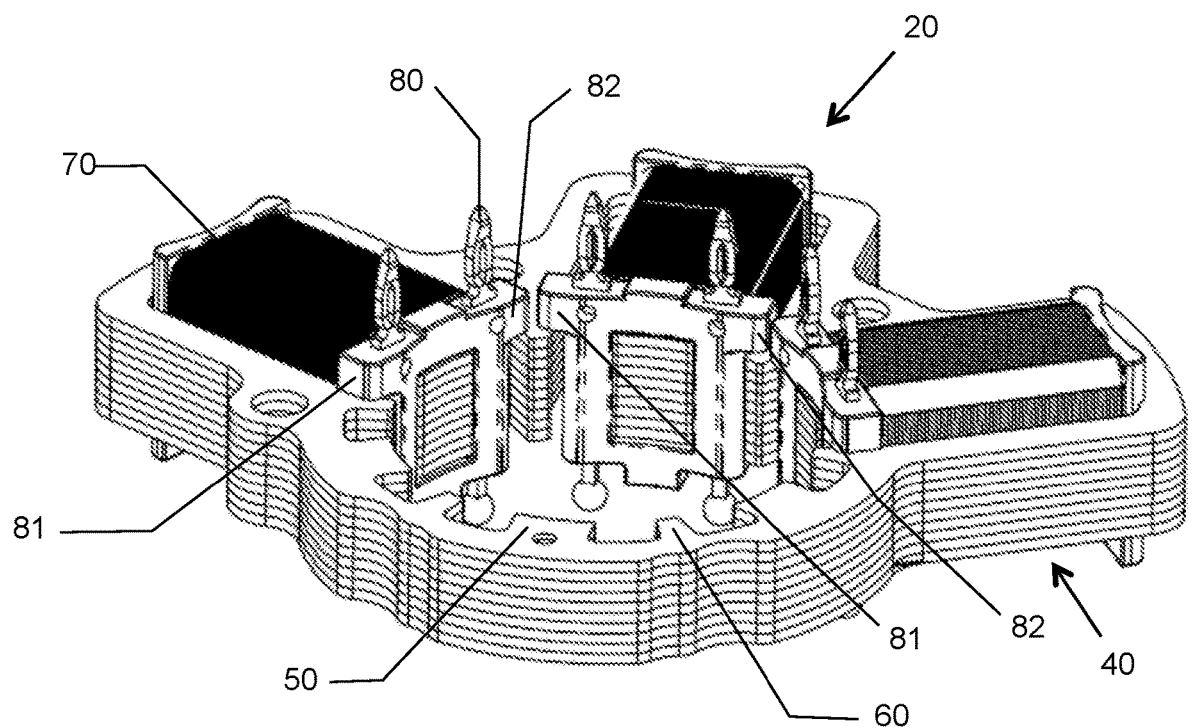
FIG. 6 shows a view of the stator to illustrate the supports of the coil bodies on the sheet metal stack to avoid bending when the printed circuit is driven out.

As shown in FIGS. 2 and 6, the housing 1 has an electric motor 20 electrically and mechanically connected to a printed circuit 21. The electric motor 20 has a structure described in patent EP2171831. Indeed, the particular form factor of this engine makes it possible to better integrate the elements of the present invention.

Figure 5:
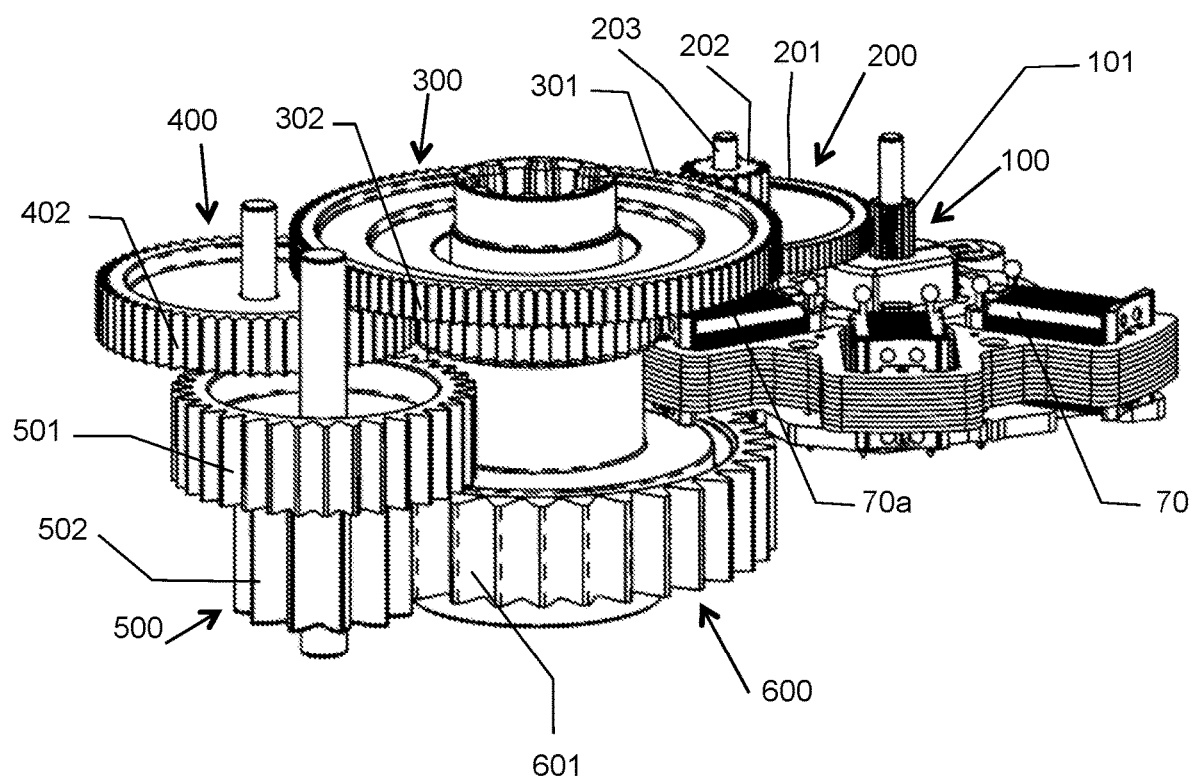
FIG. 5 shows a view of the stator and the parallel axis gear train to illustrate the stator coil between two gears along the vertical axis.

The electric motor 20 comprises a stator 40 formed by an assembly of cut sheets, having 6 wide teeth 50 and 6 narrow teeth 60, and a rotor 100, visible in FIG. 5, having N pairs of (preferably radially or festoon) magnetized poles in alternating directions. The coils 70 are placed around three of the wide teeth 50 in order to obtain the maximum torque per ampere-revolution of the motor. The rotor 100 typically has a diameter of 18 mm and permanent magnets of the NdFeB type (typical remanence of 0.75 T).

Figure 4:
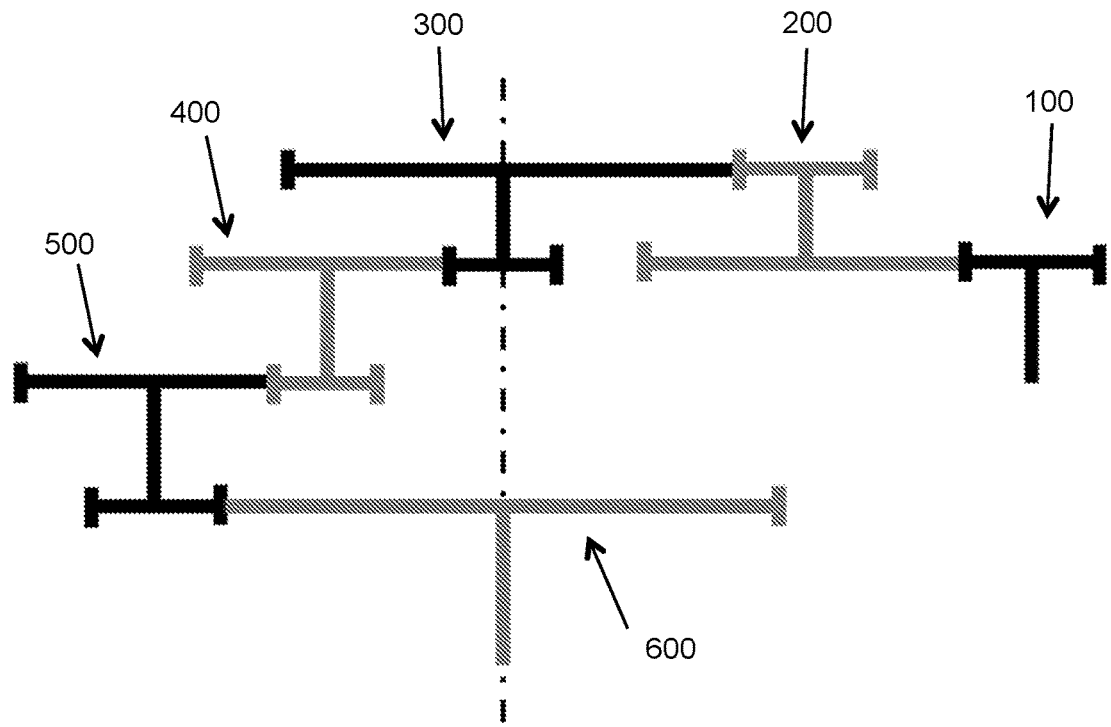
FIG. 4 shows a view of the parallel axis gear train to illustrate the wheels sequence.

As shown in FIGS. 4 and 5, a series of parallel axis gears transmit the movement of the rotor 100 of the motor 20 to the output wheel 600. This parallel axis gear train consists of 5 stages distributed on either side of the output wheel 600 which is made up of a single piece, made of plastic material moulded in the example described. The output wheel 600 is formed by a hollow cylindrical through member with a transmission tooth crown 601. One of the intermediate wheels 300 of the gear is concentric with the output wheel 600. The reduction gear comprises a series of wheels 100, 200, 300, 400, 500, 600. The transmission ratio is typically 550:1.

The output wheel 600 is positioned longitudinally between the motor 20 and the intermediate wheels 400 and 500. Advantageously, a stator coil 70a is located between two gears 200, 600 along the vertical axis. FIG. 4 schematically shows the space available between these two gears 600 and 200, the motor not being shown here.

The housing 1 comprises a bearing 23, the inner diameter of which is used for guiding the output wheel 600 and the outer diameter of which is used for guiding the concentric movable wheel 300. This makes it possible to manage play more precisely and to control bearing wear.

The first reduction stage consists of a toothed pinion 101 mounted on the rotor axis 100 which drives a toothed wheel 201 mounted on an axis 203 passing through the stator. The toothed wheel 201 is coupled to a pinion 202, the coupling can be made by moulding to form a single plastic part. The second reduction stage consists of the pinion 202 which drives the toothed wheel 301, coaxial with the hollow shaft output member 600. This toothed wheel 301 is coupled to a pinion 302 to form a single piece 300.

The third reduction stage consists of the pinion 302 which drives the toothed wheel 401 coupled to a pinion 402 to form the part 400 together. The fourth reduction stage consists of the pinion 402 which drives the large wheel 501 coupled to a small wheel 502 to form the part 500 together. The fifth reduction stage consists of the pinion 502 which finally drives the tooth crown 601 integral with the hollow shaft output member 600 and concentric with the part 300.

Motor Mounting

The windings 70 have plug-in connection pins 80 ("press-fit" connectors) extending parallel to the rotor axis 100. During the assembling, the printed circuit 21 is pressed against the pins extending perpendicular to the transverse surface of the motor, the pins being fitted into metallized transverse holes in the printed circuit 21. These pins 80 can be solid pins (which do not twist during insertion) or adaptable pins (which compress or mechanically "adapt" during insertion).

To reduce stator deformation when forcing the printed circuit 21 in, the coil body 71 has two shoulders 81, 82 on each side, transversely, of the coil 70. These shoulders 81, 82 enable the insertion force (typically 200 N) to be distributed at three points, which is taken up by the stator 40 at the central pole and two supports on the lateral poles surrounding the central pole. This force, distributed over the stator 40, is transmitted when the printed circuit 21 is inserted on the coils 70.

The rotor 100 has a functionality making it possible to limit vibrations during operation by introducing a slight friction. This functionality is made possible by using an additional flange 102 mounted after the insertion of a counter-bearing 104 and a spring 103 which applies its force to the axis 105 of rotation of the rotor 100 through said pad 104.

Figure 3:
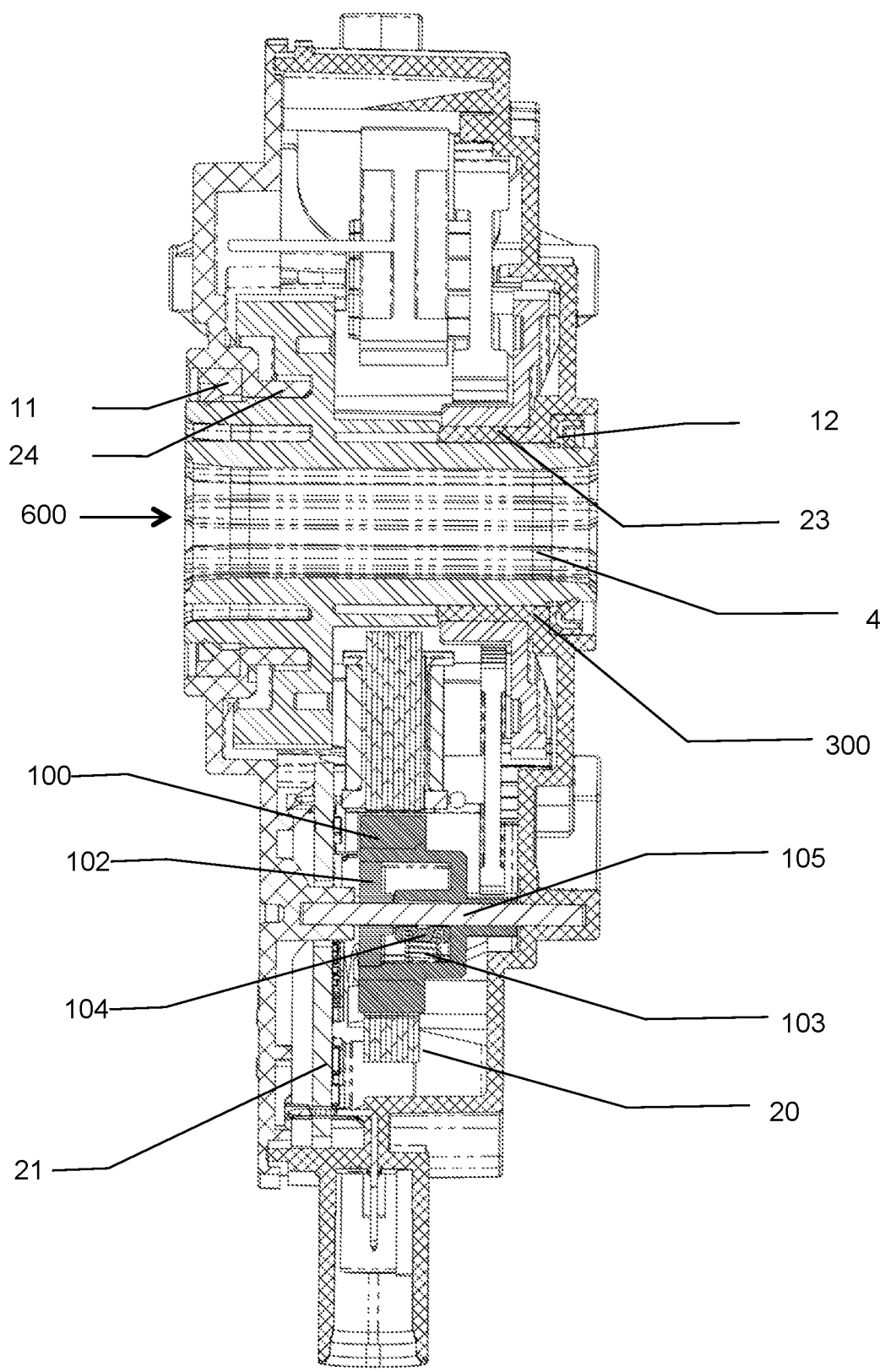
FIG. 3 shows a cross-sectional view of the motor in FIGS. 1a to 1c passing through the axis of the output wheel and the axis of the rotor to illustrate the output opening at both ends, the coaxial gears and the rotor pad concept.
Figure 7:
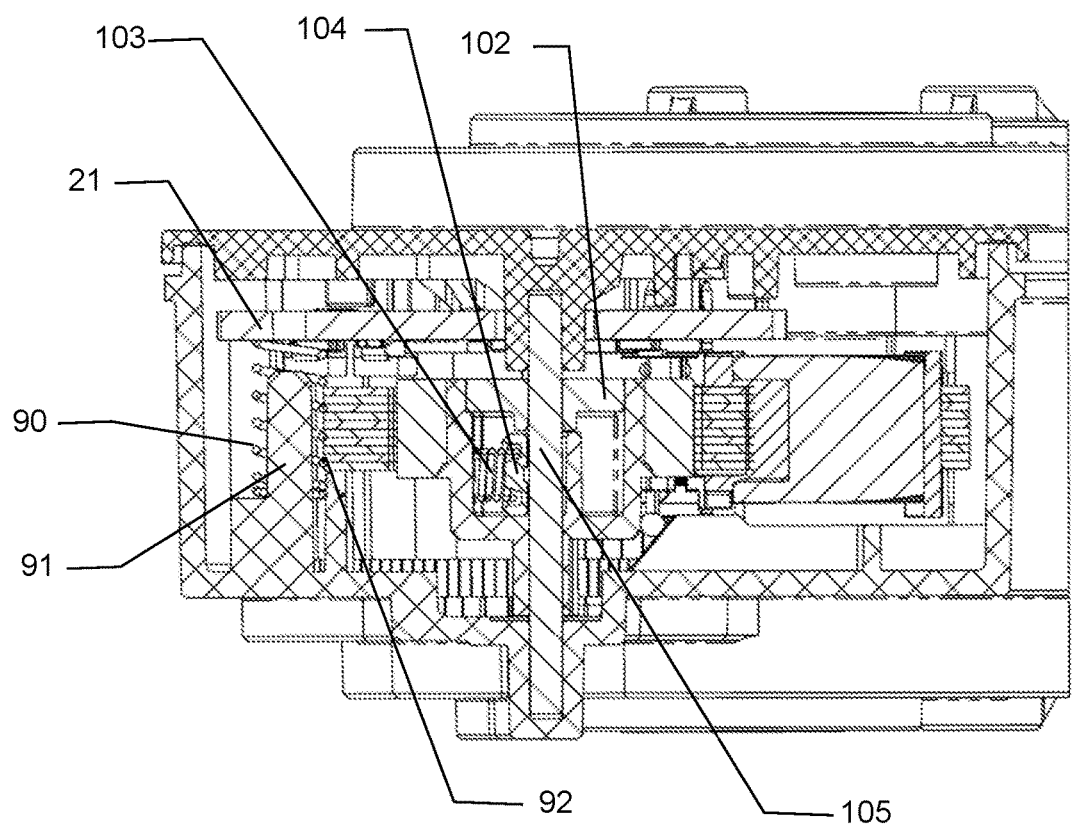
FIG. 7 shows a cross-sectional view of the motor to illustrate the concept of stator grounding and rotor pad.

This flange 102 on the rotor 100, shown in FIGS. 3 and 7, has the following advantages:
  Guiding by two concentric cylindrical bearing functions.
  If the radial magnetic force (by attraction of the rotor towards the stator), when using the motor, is greater than the force created by the pad 104, the flange 102 will limit the tilting of the rotor 100 and thus the noise.
  Constitution of a grease reservoir.
  Elimination of the risk of loss of the counter-bearing 104 and of the spring 103, particularly in the event of high vibrations due to the movement of the internal combustion engine, since the flange ensures that the counter-bearing 104 does not leave its housing.
  When using the gear motor to activate air inlet screens of an engine compartment of a motor vehicle, and to ensure that the air inlet flap cannot be opened by pressure on the flap blades when the vehicle is not moving (no power supply), the introduction of friction by the pad 104 will make it possible to increase the residual torque of the engine and ensure mechanical irreversibility. The gear motor also includes a stator (electrical) grounding functionality. For this purpose, it comprises a compression spring 90 guided by a pin 91 extending parallel to the axis of rotation of the motor 20, on the bottom of the housing and formed integrally with the housing 1. The empty length of said spring 90 being greater than the thickness of the stator 40, said compression spring 90 coming into mechanical and electrical contact with the non-insulated surface of the edge 92 of the stator sheet package and a non-insulated surface of the printed circuit 21 when compressed by said printed circuit 21 inserted on the stator 40.

The invention claimed is:

1. A gear motor comprising:
  a housing enclosing an electric motor driving a reduction gear train with parallel axes having at least one intermediate gear and an output wheel;
  said output wheel being a single piece having a tooth crown on either side of which extend cylindrical axial extensions which are each guided by said housing, each one of said extensions having at its respective end a coupling with an external drive element; and
  said output wheel being coaxial with a toothed wheel constituting one of said intermediate gears, said toothed wheel being able to rotate freely in relation with one of said axial extensions.

2. A gear motor according to claim 1, wherein said output wheel has an axial through-cavity.

3. A gear motor according to claim 1, wherein at least one of said coupling includes a recessed socket drive.

4. A gear motor according to claim 1, wherein at least one of said coupling includes two coaxial driving recesses.

5. A gear motor according to claim 1, wherein said electric motor on one hand, and at least one of said intermediate gears on another hand, are positioned on either side of a cross-sectional plan passing through an axis of said output wheel.

6. A gear motor according to claim 1, wherein said housing has two bearings operably guiding said axial extensions of an output stage.

7. A gear motor according to claim 1, wherein said motor has an output shaft provided with a worm screw.

8. A gear motor according to claim 1, wherein an axis of a rotor of said motor is parallel to an axis of said output wheel and is provided with a toothed wheel driving a first one of said intermediate gears.

9. A gear motor according to claim 8, wherein said rotor of said motor is provided with a dry friction pad.

10. A gear motor according to claim 1, further comprising a rotor comprising a toothed wheel and a flange guiding said rotor in rotation about an axis, as well as a spring and a counter-bearing so that said spring presses said counter-bearing on said axis of rotation in order to exert a friction force.

11. A gear motor according to claim 8, further comprising a stator of said motor including a stack of sheets having N radially extending teeth, N being between 6 and 12, at least two of said teeth being wound.

12. A gear motor according to claim 11, wherein at least one of said wound teeth extends into a space delimited by said output wheel on one hand and said wheel of one of said intermediate gears on another hand.

13. A gear motor according to claim 12, wherein at least one of said wound teeth is accommodated, in a direction parallel to an output shaft, between a surface of said output wheel on one hand and an upper surface of said wheel of one of said intermediate gears on another hand.

14. A gear motor according to claim 11, further comprising coils supported by a coil body having shoulders resting on edges of teeth adjacent to a pole carrying said coil, said coil body having connection pins adapted to interconnect a printed circuit by a force fitting, in a direction perpendicular to a bearing plan of said shoulders.

15. A gear motor according to claim 11, further comprising:
  a compression spring guided by a pin extending parallel to said axis of rotation of said motor, on a bottom of said housing;

a length of said spring being greater than the thickness of said stator; and said compression spring coming into mechanical and electrical contact with a non-insulated surface of an edge of a stator sheet package and a non-insulated surface of a printed circuit when compressed by said printed circuit superposed on said stator.

16. A gear motor according to claim 8, wherein said first intermediate gear drives a second of said intermediate gears coaxial with said output wheel.

17. A gear motor according to claim 1, wherein said gear coaxial with said output wheel drives an additional intermediate gear including a part having two coaxial toothed wheels/pinions having different cross-sections.

18. A gear motor according to claim 1, further comprising the motor adjusting air intake screens of an engine compartment of a motor vehicle.

19. A gear motor according to claim 1, wherein said housing has a bearing, an inner diameter of which is used for guiding said output wheel, and an outer diameter of which is used for guiding said toothed wheel.

* * * * *